(12) United States Patent
Urashima et al.

(10) Patent No.: US 8,467,000 B2
(45) Date of Patent: Jun. 18, 2013

(54) CAMERA DEVICE AND MANUFACTURING METHOD FOR A CAMERA DEVICE

(75) Inventors: Yoshihito Urashima, Fukuoka (JP); Jyouji Wada, Kanagawa (JP); Noboru Takada, Kanagawa (JP); Kazushige Tamura, Kanagawa (JP); Tamotsu Uchida, Fukuoka (JP); Keiichi Tamura, Kanagawa (JP); Yoshikatsu Henmi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/266,523

(22) PCT Filed: Feb. 17, 2010

(86) PCT No.: PCT/JP2010/000998
§ 371 (c)(1),
(2), (4) Date: Dec. 15, 2011

(87) PCT Pub. No.: WO2011/125719
PCT Pub. Date: Nov. 4, 2010

(65) Prior Publication Data
US 2012/0092550 A1 Apr. 19, 2012

(30) Foreign Application Priority Data

Apr. 30, 2009 (JP) ................................. 2009-110343

(51) Int. Cl.
*H04N 5/225* (2006.01)
*H04N 3/14* (2006.01)

(52) U.S. Cl.
USPC ........... 348/374; 348/340; 348/294; 348/373; 348/376

(58) Field of Classification Search
USPC .......... 348/373–376, 335, 340, 294; 359/405, 359/407, 433, 473; 438/106; 29/592.1
See application file for complete search history.

(56) References Cited

U.S. PATENT DOCUMENTS 6,282,021 B1 * 8/2001 Yano .............................. 359/415
6,848,969 B2 * 2/2005 Luderich ........................... 451/5
(Continued)

FOREIGN PATENT DOCUMENTS

| JP | 1-269233 | 10/1989 |
| JP | 2002-77699 | 3/2002 |

(Continued)

OTHER PUBLICATIONS

Search report from E.P.O., mail date is Feb. 1, 2012.

*Primary Examiner* — Nhan T Tran
*Assistant Examiner* — Xi Wang
(74) *Attorney, Agent, or Firm* — Greenblum & Bernstein, P.L.C.

(57) ABSTRACT

A camera device includes an image sensor which is assembled into a case, a first perspective-control component including a convex partial spherical surface for performing perspective control, and a second perspective-control component including a concave partial spherical surface having a radius of curvature and a center of curvature which are equal to those of the convex partial spherical surface. Before completion of the assembly of the image sensor into the case, the second perspective-control component is mounted on the first perspective-control component attached to a back side of the image sensor, and perspective control is performed with the convex partial spherical surface and the concave partial spherical surface in surface contact with each other. The first perspective-control component and the second perspective-control component are secured to each other via an adhesive after completion of the perspective control.

5 Claims, 7 Drawing Sheets

U.S. PATENT DOCUMENTS

| | | | |
|---|---|---|---|
| 7,333,147 B2 * | 2/2008 | Adachi et al. | 348/374 |
| 7,528,884 B2 * | 5/2009 | Minamio et al. | 348/373 |
| 8,275,254 B2 * | 9/2012 | Lin et al. | 396/535 |
| 2001/0033338 A1 * | 10/2001 | Hunter | 348/335 |
| 2004/0051805 A1 * | 3/2004 | Yoshikawa et al. | 348/335 |
| 2005/0219398 A1 | 10/2005 | Sato et al. | |

FOREIGN PATENT DOCUMENTS

| | | | |
|---|---|---|---|
| JP | 2002-077699 | * | 3/2002 |
| JP | 2003-244526 | * | 8/2003 |
| JP | 2003-319217 | | 11/2003 |
| JP | 2004-287304 | | 10/2004 |
| JP | 2005-286888 | | 10/2005 |
| JP | 2006-81007 | | 3/2006 |
| JP | 2007-178723 | | 7/2007 |

* cited by examiner

CAMERA DEVICE AND MANUFACTURING METHOD FOR A CAMERA DEVICE

TECHNICAL FIELD

The present invention relates to a camera device including an image sensor, and specifically relates to a technique for adjusting an inclination of an image plane of an image sensor relative to an optical axis, that is, a technique for perspective control.

BACKGROUND ART

Conventionally, there have been proposed imaging apparatuses including a function that adjusts an inclination of an image plane of an image sensor relative to an optical axis (perspective control) (see, for example, patent document 1). In a conventional imaging apparatus, an optical axis angle adjustment panel, which holds an image sensor, is provided with a convex semispherical surface, and a thread portion for image formation position adjustment is provided with a concave semispherical surface. The convex semispherical surface and the concave semispherical surface have radiuses of curvature equal to each other, and each have a center of curvature set in a center of imaging, and are constantly in surface contact with each other.

In such conventional imaging apparatus, first, when assembling an image sensor into a case, the center of curvature of the convex semispherical surface of the optical axis angle adjustment panel and a center of an image area of an image plane of the image sensor are aligned (center alignment), and after the completion of the assembly of the image sensor into the case, the thread portion for image formation position adjustment is rotated to move in a Z-axis direction, thereby adjusting an image formation position (focus position), and subsequently, the optical axis angle adjustment panel is rotated with reference to an X-axis with a center of the image plane as a center of rotation, thereby adjusting an angle of the optical axis (without moving the adjusted image formation position).

However, in the conventional camera devices, the work for perspective control of an image plane should be performed after the completion of the center alignment for the image plane and the focus position adjustment, resulting in a low degree of flexibility in the order (the timing) for the perspective control work (for example, the perspective control work cannot solely be performed in advance). Furthermore, the optical axis angle adjustment panel and the thread portion for image formation adjustment are relatively-large members, making it difficult to save the space inside the case (reduce the size of the camera device).

CITATION LIST

Patent Literature

Patent Literature 1: Japanese Patent Laid-Open No. 2002-77699

SUMMARY OF INVENTION

Technical Problem

The present invention has been made against the aforementioned background. An object of the present invention is to provide a camera device having a high degree of flexibility in the order for perspective control work, and enabling saving of the space inside a case (reduction in size of the camera device).

Solution to Problem

An aspect of the present invention provides a camera device. The camera device includes: an image sensor that is assembled into a case; a first perspective-control component that is attached to a back side of the image sensor and includes a convex partial spherical surface for adjusting an inclination of an image plane of the image sensor relative to an optical axis; and a second perspective-control component that is mounted on the first perspective-control component and includes a concave partial spherical surface having a radius of curvature and a center of curvature that are equal to those of the convex partial spherical surface. Before completion of the assembly of the image sensor into the case, the second perspective-control component can be mounted on the first perspective-control component, the inclination of the image plane can be adjusted with the convex partial spherical surface and the concave partial spherical surface in surface contact with each other, and the first perspective-control component and the second perspective-control component can be secured to each other after completion of the adjustment.

Another aspect of the present invention provides a method for manufacturing a camera device. The manufacturing method includes a method for manufacturing a camera device including an image sensor that is assembled into a case, a first perspective-control component including a convex partial spherical surface for adjusting an inclination of an image plane of the image sensor relative to an optical axis, and a second perspective-control component including a concave partial spherical surface having a radius of curvature and a center of curvature that are equal to those of the convex partial spherical surface. The manufacturing method includes: mounting the second perspective-control component on the first perspective-control component attached to a back side of the image sensor before completion of the assembly of the image sensor into the case; adjusting the inclination of the image plane relative to the optical axis with the convex partial spherical surface and the concave partial spherical surface in surface contact with each other; and securing the first perspective-control component and the second perspective-control component to each other after completion of the adjustment.

As described below, there are other aspects of the present invention. Accordingly, the disclosure of the present invention herein is intended to provide a part of the aspects of the present invention, and is not intended to limit the scope of the invention described and claimed herein.

DESCRIPTION OF EMBODIMENTS

Figure 1:
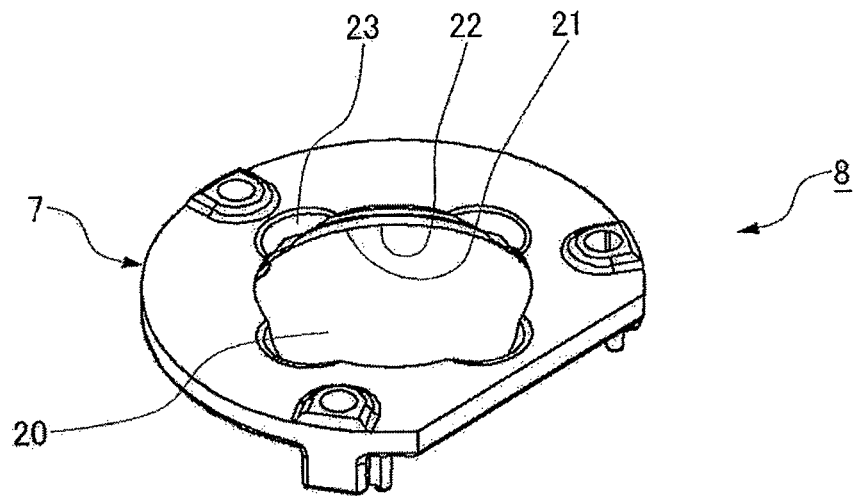
FIG. 1 is an exploded perspective view of configurations of an image sensor, a first perspective-control component and a second perspective-control component according to an embodiment of the present invention.
Figure 1:
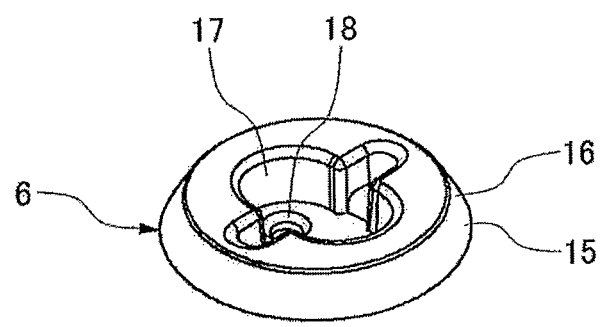
Figure 1:
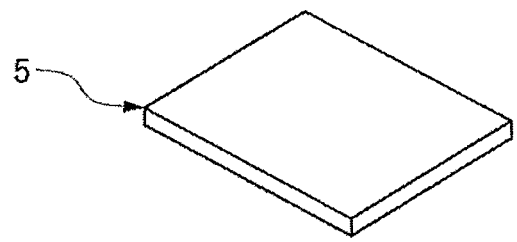

A detailed description of the present invention will be provided below. However, the below detailed description and the attached drawings do not limit the invention. Instead, the scope of the invention is defined by the attached claims.

A camera device according to the present invention includes: an image sensor that is assembled into a case; a first perspective-control component that is attached to a back side of the image sensor and includes a convex partial spherical surface for adjusting an inclination of an image plane of the image sensor relative to an optical axis; and a second perspective-control component that is mounted on the first perspective-control component and includes a concave partial spherical surface having a radius of curvature and a center of curvature that are equal to those of the convex partial spherical surface, the camera device being configured so that before completion of the assembly of the image sensor into the case, the second perspective-control component can be mounted on the first perspective-control component, the inclination of the image plane can be adjusted with the convex partial spherical surface and the concave partial spherical surface in surface contact with each other, and the first perspective-control component and the second perspective-control component can be secured to each other after completion of the adjustment.

With such configuration, when assembling the image sensor into the case, the work for adjusting the inclination of the image plane relative to the optical axis (perspective control) can solely be performed in advance. Accordingly, e.g., the work for center alignment for the image plane and focus position adjustment can be performed after the end of the perspective control work (separately from the perspective control work). Consequently, the respective work can separately be performed, increasing the degree of flexibility in the order for the perspective control work. Furthermore, the perspective-control components (the first perspective-control component and the second perspective-control component) are relatively-small components, enabling saving the space inside the case (reduction in size of the camera device).

Furthermore, the camera device according to the present invention may be configured so that a gap for receiving therein an adhesive for securing the first perspective-control component and the second perspective-control component to each other is formed between the first perspective-control component and the second perspective-control component.

With such configuration, as a result of pouring the adhesive into the gap formed between the first perspective-control component and the second perspective-control component, the first perspective-control component and the second perspective-control component can be secured to each other. In particular, in this case, when assembling the image sensor into the case (before completion of the assembly into the case), the work for perspective control can be performed, making the work for securing the first perspective-control component and the second perspective-control component to each other via the adhesive extremely easy (compared to a case where the adhesive is used after completion of the assembly into the case).

Furthermore, the camera device according to the present invention may be configured so that: the first perspective-control component includes a continuous partial spherical surface that is continuous with the convex partial spherical surface; the second perspective-control component includes a tapered surface facing the continuous partial spherical surface; and the gap for receiving the adhesive therein is formed between the continuous partial spherical surface and the tapered surface.

With such configuration, as a result of pouring the adhesive into the gap formed between the continuous partial spherical surface and the tapered surface, the first perspective-control component and the second perspective-control component can be secured to each other.

Furthermore, the camera device according to the present invention may be configured so that one of the convex partial spherical surface and the concave partial spherical surface or one of the continuous partial spherical surface and the tapered surface has been subjected to abrasive blasting.

With such configuration, one of the convex partial spherical surface and the concave partial spherical surface, or one of the continuous partial spherical surface and the tapered surface has been subjected to abrasive blasting, enhancing a securing force provided by the adhesive. In this case, perspective control can smoothly be performed with the convex partial spherical surface and the concave partial spherical surface in surface contact with each other, compared to a case where both of the convex partial spherical surface and the concave partial spherical surface have been subjected to abrasive blasting.

A method for manufacturing a camera device according to the present invention includes a method for manufacturing a camera device including an image sensor that is assembled into a case, a first perspective-control component including a convex partial spherical surface for adjusting an inclination of an image plane of the image sensor relative to an optical axis, and a second perspective-control component including a concave partial spherical surface having a radius of curvature and a center of curvature that are equal to those of the convex partial spherical surface, the method including: mounting the second perspective-control component on the first perspective-control component attached to a back side of the image sensor before completion of the assembly of the image sensor into the case; adjusting the inclination of the image plane relative to the optical axis with the convex partial spherical surface and the concave partial spherical surface in surface contact with each other; and securing the first perspective-control component and the second perspective-control component to each other after completion of the adjustment.

With such manufacturing method, also, when assembling the image sensor into the case, the work for adjusting the inclination of the image plane relative to the optical axis (perspective control) can solely be performed in advance as with the aforementioned configurations. Accordingly, e.g., the work for center alignment for the image plane and focus position adjustment can be performed after the end of the perspective control work (separately from the perspective control work). Consequently, the respective work can separately be performed, increasing the degree of flexibility in the order for the perspective control work.

According to the present invention, when assembling an image sensor into a case, the work for adjusting an inclination of an image plane relative to an optical axis (perspective control) can solely be performed in advance, increasing the degree of flexibility in the order for the perspective control work.

Hereinafter, a camera device according to an embodiment of the present invention will be described with reference to the drawings. The present embodiment will be described in terms of a case of a camera device used as, e.g., a monitoring camera or a home-use video camera.

Figure 2:
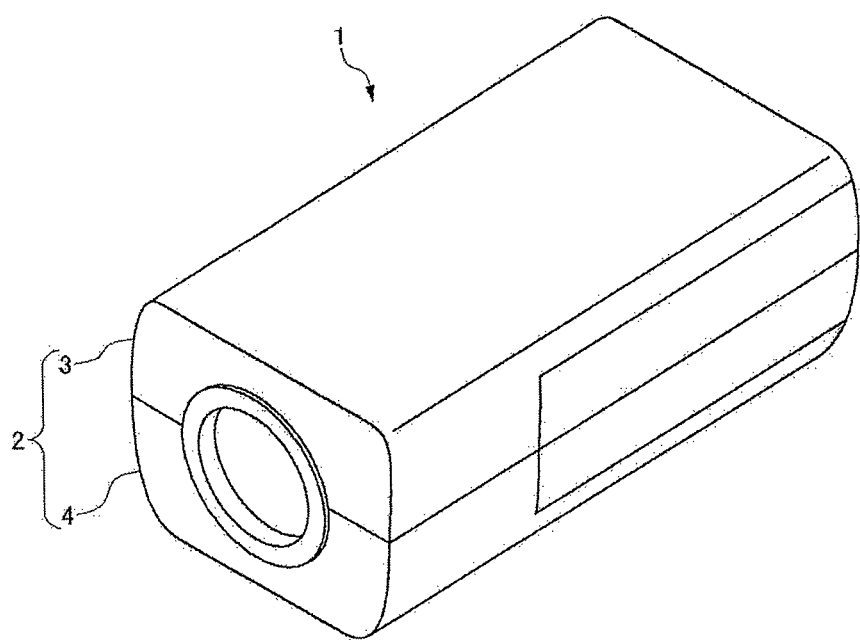
FIG. 2 is a perspective view of an outer appearance of a camera device according to the present embodiment.

A configuration of a camera device according to an embodiment of the present invention will be described with reference to the drawings. FIG. 1 is an exploded perspective view of a configuration of a main part of the present embodiment (an image sensor, a first perspective-control component and a second perspective-control component). FIG. 2 is a perspective view of an outer appearance of the camera device according to the present embodiment, and FIG. 3 is an exploded perspective view of a configuration inside a case of the camera device.

As illustrated in FIG. 2, a case 2 of a camera device 1 includes an upper case 3 and a lower case 4, and an image sensor 5 such as a CCD is assembled inside the case 2. As illustrated in FIG. 1, a first perspective-control component 6 is attached to a back side (side opposite to an image plane) of the image sensor 5, and a second perspective-control component 7 is attached to the first perspective-control component 6.

Figure 3:
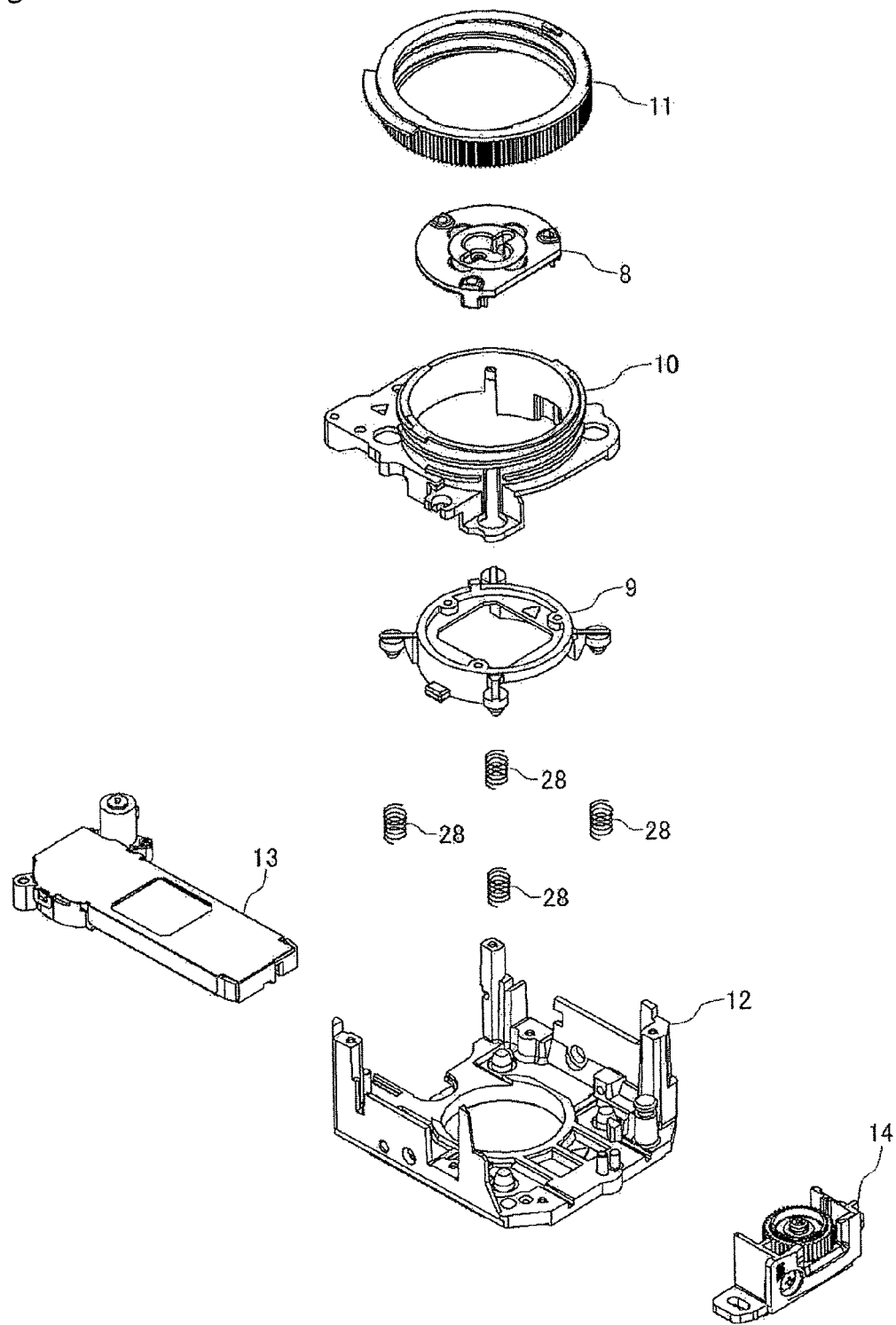
FIG. 3 is an exploded perspective view of a configuration inside a case of the camera device.

As illustrated in FIG. 3, an image sensor unit 8 including the image sensor 5, the first perspective-control component 6 and the second perspective-control component 7 is screwed to a support frame 9 and assembled to a front frame 12 together with, e.g., a focus position adjustment frame 10 and a focus position adjustment ring 11. In this case, the support frame 9 is pressed against the focus position adjustment ring 11 side (the upper side in FIG. 3) by means of an elastic force of coil springs 28. Furthermore, e.g., an optical filter unit 13 and a drive unit 14 for focus position adjustment are assembled to the front frame 12. Then, the front frame 12 is attached to the inside of the case 2.

Figure 9:
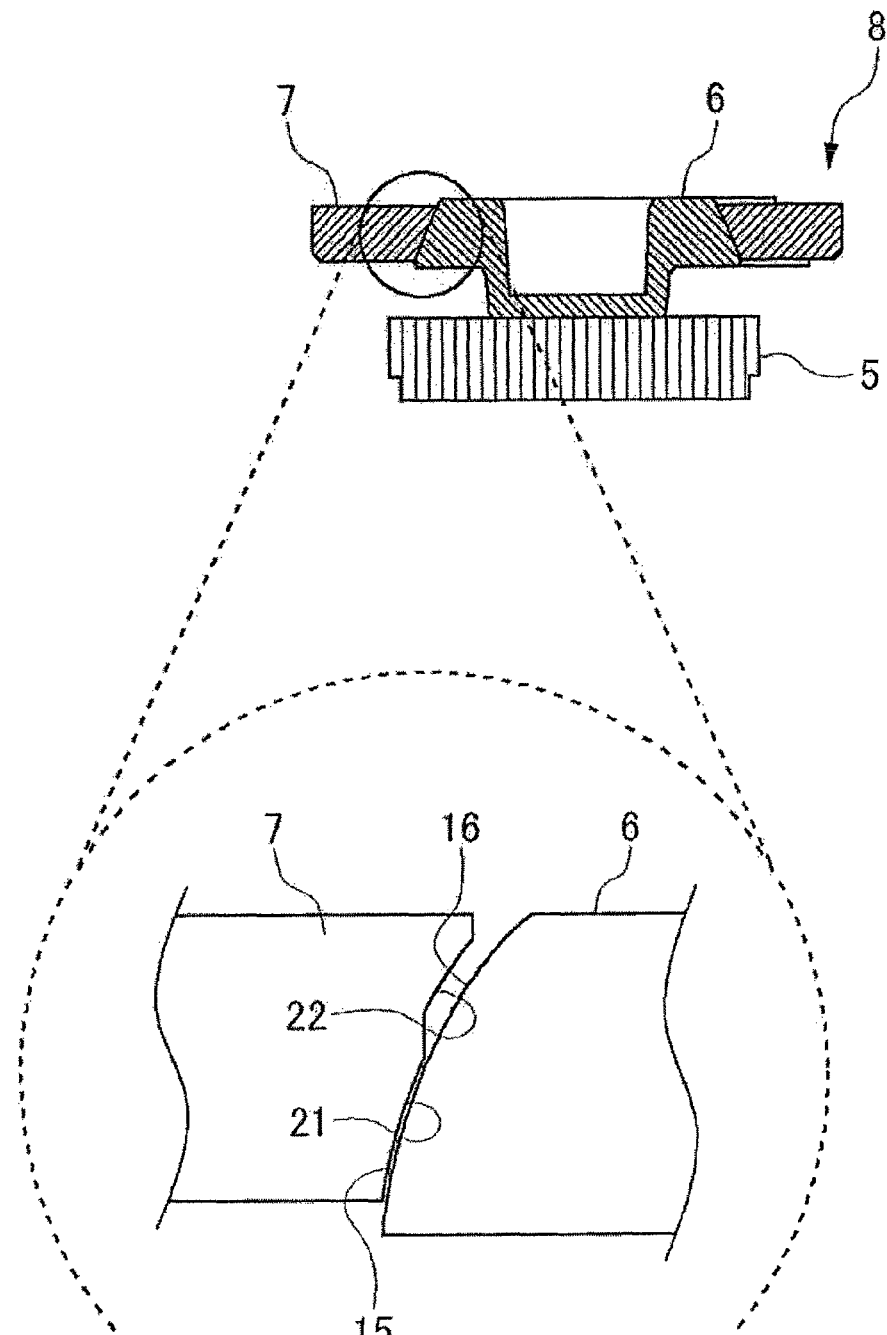
FIG. 9 is an enlarged view of a gap between the first perspective-control component and the second perspective-control component.

A convex partial spherical surface 15 for adjusting an inclination of the image plane relative to an optical axis (perspective control) is provided at a lower portion of an outer periphery of the first perspective-control component 6, and a continuous partial spherical surface 16 that is continuous with the convex partial spherical surface 15 is provided at an upper portion of the outer periphery of the first perspective-control component 6 (see FIG. 9). The convex partial spherical surface 15 and the continuous partial spherical surface 16 have been subjected to abrasive blasting (processing for roughening a surface).

Figure 5:
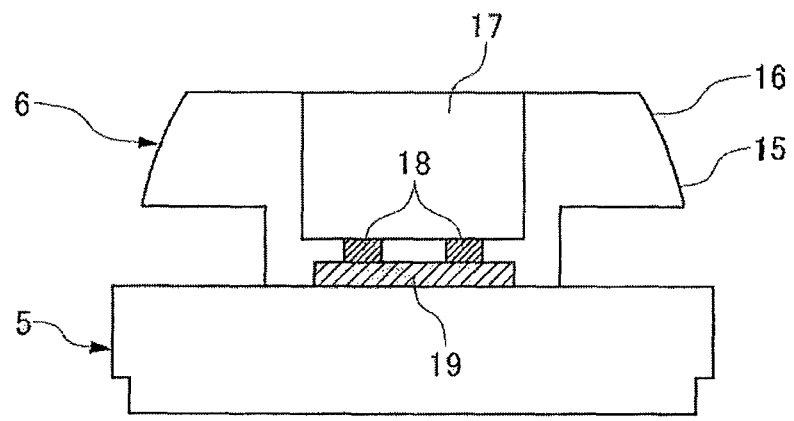
FIG. 5 is a cross sectional side view illustrating a manner of securing the image sensor and the first perspective-control component to each other via an adhesive.

Furthermore, a recess portion 17 is provided at a center portion of the first perspective-control component 6, and two inlets 18 for injecting an adhesive for securement to the image sensor 5 are provided at a bottom surface of the recess portion 17 (see FIG. 5). Furthermore, at a bottom surface of the first perspective-control component 6, a charging space 19 in which the adhesive injected from the inlets 18 is charged is provided in the form of a recess (see FIG. 5). In FIG. 5, the adhesive is indicated by hatched lines.

An opening portion 20 in which the first perspective-control component 6 is to be fitted is provided at a center portion of the second perspective-control component 7. A concave partial spherical surface 21 having a radius of curvature and a center of curvature that are equal to those of the convex partial spherical surface 15 is provided at a lower portion of a peripheral edge of the opening portion 20, and a tapered surface 22 is provided at an upper portion of the peripheral edge of the opening portion 20 so as to face the continuous partial spherical surface 16 (see FIG. 9). In a state in which the second perspective-control component 7 is mounted on the first perspective-control component 6, the convex partial spherical surface 15 and the concave partial spherical surface 21 are in surface contact with each other while a gap is formed between the continuous partial spherical surface 16 and the tapered surface 22. In this case, the tapered surface 22 is formed one step back from the concave partial spherical surface 21 so as to form a gap with a substantially uniform width (see FIG. 9). An adhesive for securing the first perspective-control component 6 and the second perspective-control component 7 to each other is poured into the gap.

Figure 8:
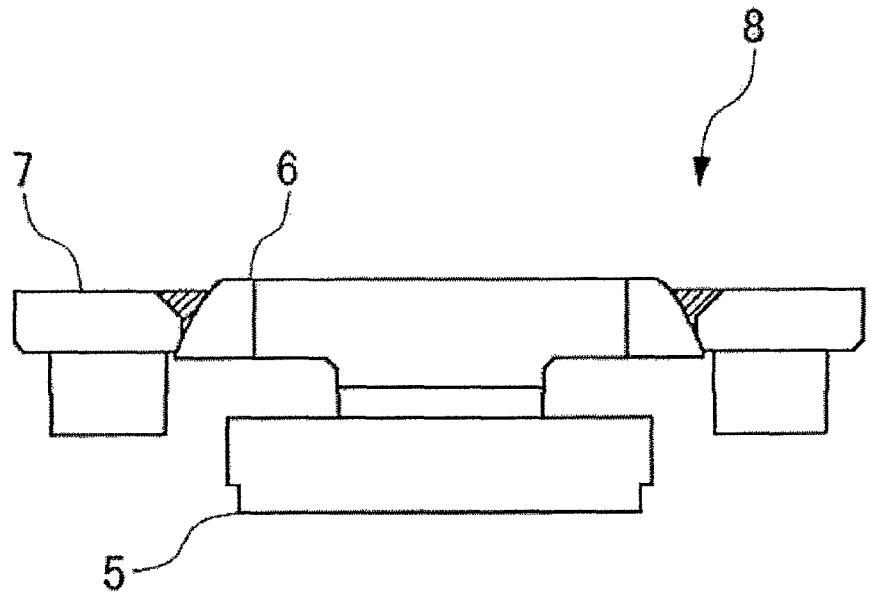
FIG. 8 is a perspective view illustrating a manner of securing the first perspective-control component and the second perspective-control component to each other via an adhesive.

Furthermore, an injection recess portion 23 for pouring the adhesive for the securement to the first perspective-control component 6 is provided at each of four positions at an upper surface of the second perspective-control component 7 (see FIGS. 1 and 8). The injection recess portions 23, which are continuous with the tapered surface 22, is configured so that an adhesive injected from the injection recess portions 23 is poured into the gap between the continuous partial spherical surface 16 and the tapered surface 22. In FIG. 8, also, the adhesive is indicated by hatched lines.

An operation of the camera device 1 configured as described above will be described with reference to the drawings. Hereinafter, a process for manufacturing the camera device 1 according to the present invention will be described as a characteristic operation of the present invention. Here, in particular, a description will be provided focusing on a step of performing perspective control of the image sensor 5 before completion of assembly of the image sensor 5 into the case 2.

Figure 4:
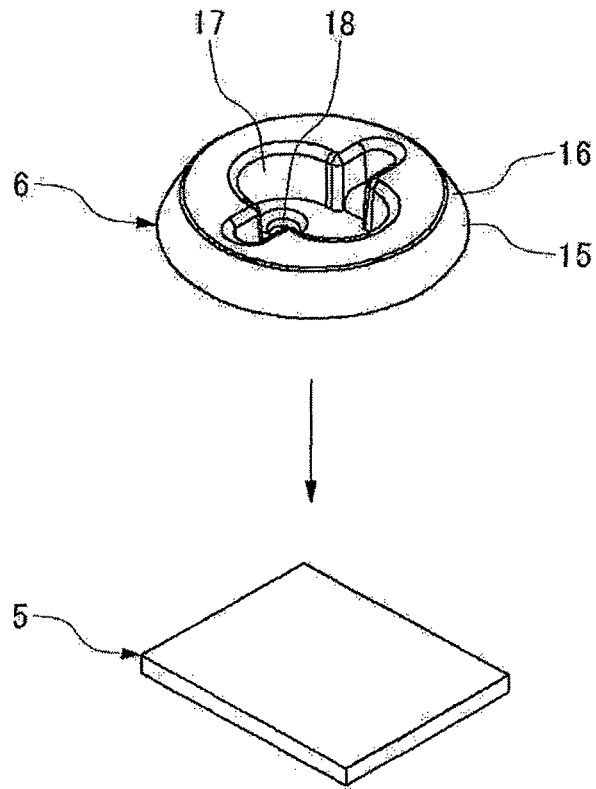
FIG. 4 is a perspective view illustrating a manner of mounting a first perspective-control component on a back side of the image sensor.

When the camera device 1 according to the present embodiment is manufactured, first, as illustrated in FIG. 4, the first perspective-control component 6 is mounted on the back side of the image sensor 5. In this case, the recess portion 17 of the first perspective-control component 6 has a substantially cross-like shape in a plan view, and thus, the first perspective-control component 6 can easily be positioned at a center of the image sensor 5 with reference to the shape (cross-like shape) of the recess portion 17.

Next, as illustrated in FIG. 5, an adhesive is injected from the inlets 18 of the first perspective-control component 6 to charge the adhesive in the charging space 19 between the first perspective-control component 6 and the image sensor 5. Then, the adhesive is cured to secure the first perspective-control component 6 and the image sensor 5 to each other. In this case, the adhesive used is an anaerobic adhesive including an ultraviolet curable resin as a material thereof. Accordingly, the adhesive is cured in a short period of time by applying ultraviolet light from above the first perspective-control component 6. Furthermore, for a part that the ultraviolet light does not reach (part in shade), the adhesive is cured in a relatively short period of time by blocking the contact with the air (charging a sufficient amount of adhesive).

Figure 6:
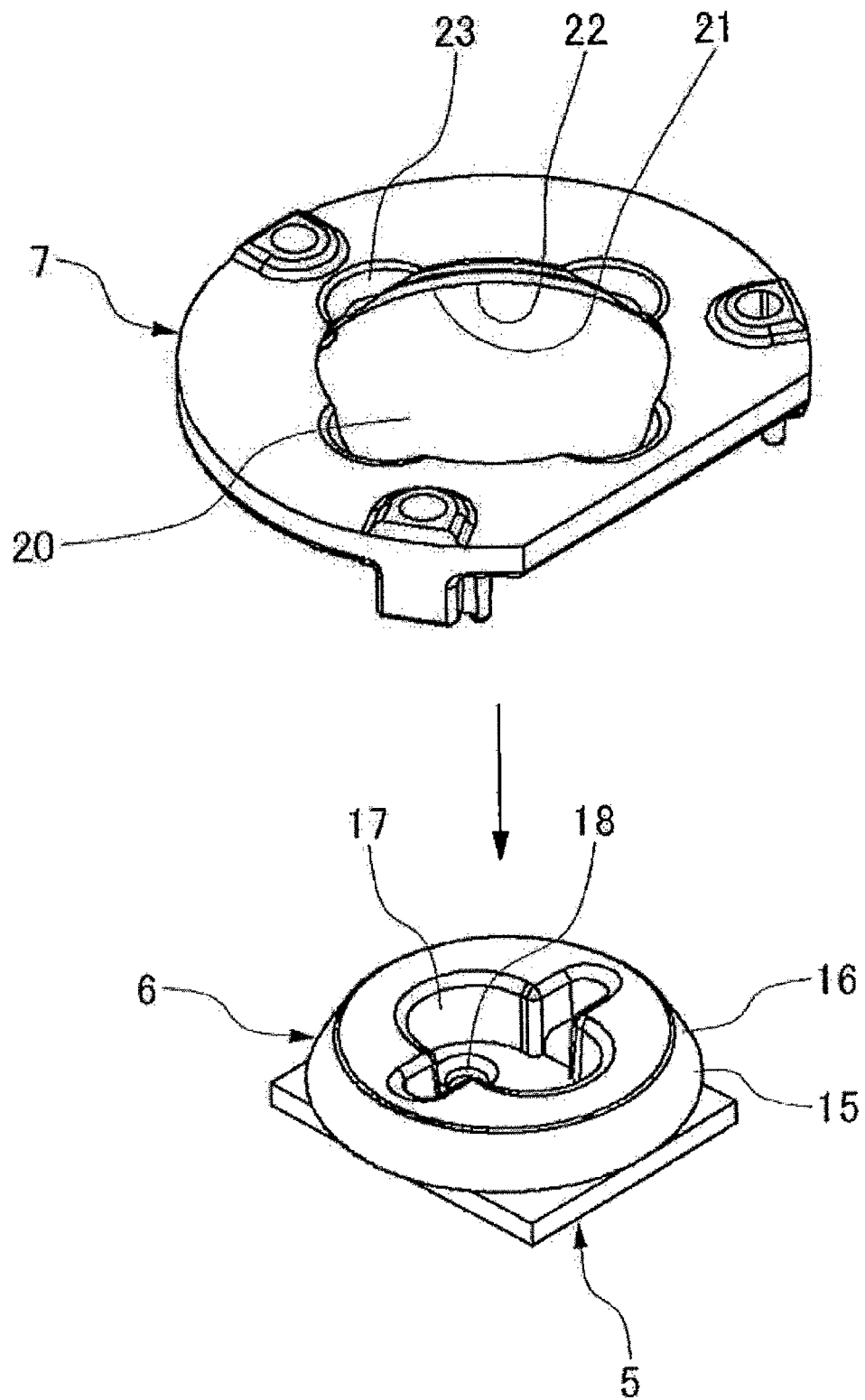
FIG. 6 is a perspective view illustrating a manner of mounting a second perspective-control component on the first perspective-control component.

When the adhesive is sufficiently cured, thereby securing the image sensor 5 and the first perspective-control component 6 to each other, as illustrated in FIG. 6, the second perspective-control component 7 is mounted on the first perspective-control component 6. In this case, the four injection recess portions 23 of the second perspective-control component 7 are arranged so as to form a cross-like shape in a plan view, and thus, the second perspective-control component 7 can easily be positioned by following the shape (cross-like shape) of the recess portion 17 of the first perspective-control component 6.

Figure 7:
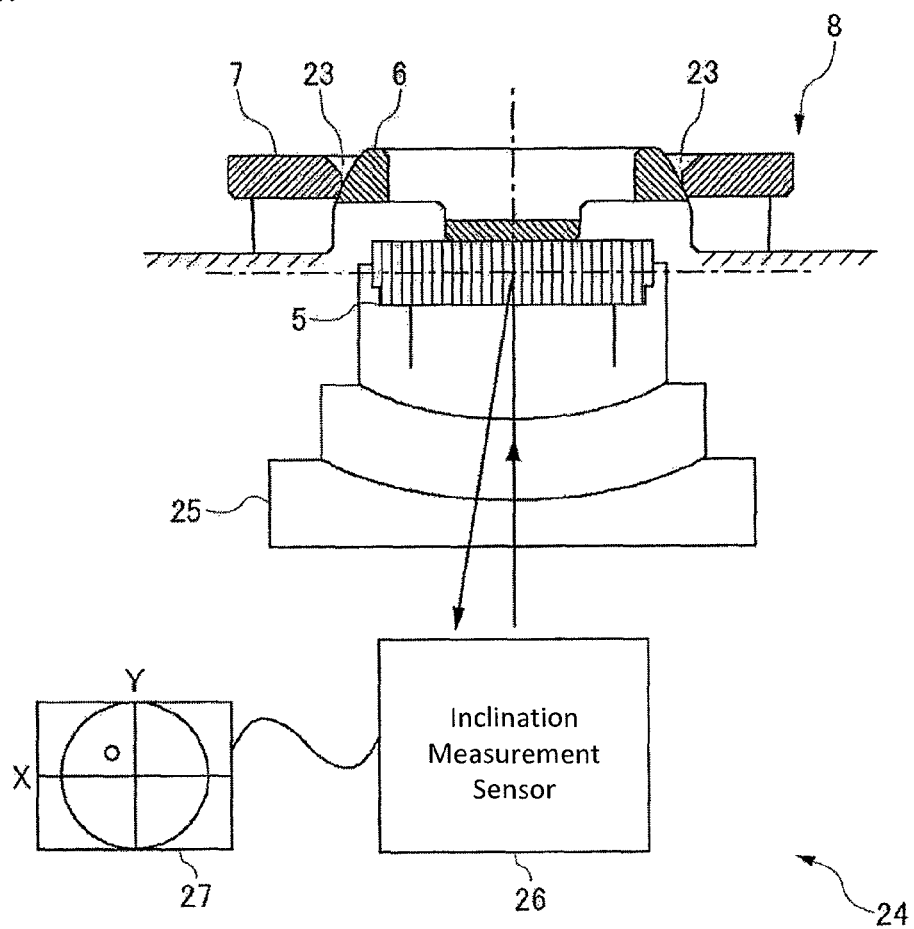
FIG. 7 is a cross-sectional side view illustrating a manner of performing perspective control of the image sensor.

Then, as illustrated in FIG. 7, perspective control of the image plane of the image sensor 5 is performed. In this example, first, a tool 24 for perspective control is attached to the image plane side of the image sensor 5 (the lower side of FIG. 7). The tool 24 includes a biaxial goniometric stage 25 capable of holding the image sensor 5 and adjusting inclinations in X and Y-axis directions of the image plane, an inclination measurement sensor 26 that measures a position of reflected light resulting from laser light being applied to the image plane, and a monitor 27 that displays the measured position of the reflected light. When performing perspective control of the image plane of the image sensor 5, the inclinations in X and Y-axis directions of the image plane are adjusted so that the reflected light resulting from the laser light being applied to the image plane is positioned at a center in the X and Y axes with the convex partial spherical surface 15 and the concave partial spherical surface 21 in surface contact with each other.

Upon completion of the perspective control, as illustrated in FIG. 8, an adhesive is injected from the injection recess portions 23 of the second perspective-control component 7 to pour the adhesive into the gap between the first perspective-control component 6 and the second perspective-control component 7 (the gap between the continuous partial spherical surface 16 and the tapered surface 22) (see FIG. 9). In this case, also, the adhesive used is an anaerobic adhesive including an ultraviolet curable resin as a material thereof. Accordingly, the adhesive in the injection recess portions 23 is cured in a short period of time by applying ultraviolet light from above the second perspective-control component 7. Furthermore, for a part that the ultraviolet light does not reach (part in shade), the adhesive in the gap is cured in a relatively short period of time since the adhesive is blocked from the contact with the air.

According to the camera device 1 according to the embodiment of the present invention as described above, when assembling the image sensor 5 into the case 2, the work for adjusting the inclination of the image plane relative to the optical axis (perspective control) can be performed in advance, increasing the degree of flexibility in the order for the perspective control work.

In other words, in the present embodiment, when assembling the image sensor 5 into the case 2, the work for adjusting the inclination of the image plane relative to the optical axis (perspective control) can solely be performed in advance. Accordingly, e.g., the work for center alignment for the image plane and focus position adjustment can be performed after the end of the perspective control work (separately from the perspective control work). Consequently, the respective work can separately be performed, increasing the degree of flexibility in the order for the perspective control work. Furthermore, the perspective-control components (the first perspective-control component 6 and the second perspective-control component 7) are relatively-small components, enabling saving the space inside the case 2 (reduction in size of the camera device 1).

Furthermore, in the present embodiment, as a result of pouring the adhesive into the gap formed between the first perspective-control component 6 and the second perspective-control component 7, the first perspective-control component 6 and the second perspective-control component 7 can be secured to each other. In particular, in this case, when assembling the image sensor 5 into the case 2 (before completion of the assembly into the case 2), the work for perspective control can be performed, making the work for securing the first perspective-control component 6 and the second perspective-control component 7 to each other via the adhesive extremely easy (compared to a case where the adhesive is used after completion of the assembly into the case 2).

Furthermore, in the present embodiment, as a result of pouring the adhesive into the gap formed between the continuous partial spherical surface 16 and the tapered surface 22, the first perspective-control component 6 and the second perspective-control component 7 can be secured to each other.

Furthermore, in the present embodiment, one of the convex partial spherical surface 15 and the concave partial spherical surface 21, or one of the continuous partial spherical surface 16 and the tapered surface 22 has been subjected to abrasive blasting, enhancing a securing force provided by the adhesive. In this case, perspective control can smoothly be performed with the convex partial spherical surface 15 and the concave partial spherical surface 21 in surface contact with each other, compared to a case where both of the convex partial spherical surface 15 and the concave partial spherical surface 21 have been subjected to abrasive blasting.

Although an embodiment of the present invention has been described above by indicating an example, the scope of the present invention is not limited to the example, and modifications and variations are possible according to purposes as long as such modifications and variations fall within the scope of the claims.

For example, although the above description has been provided in terms of an example in which the convex partial spherical surface 15 and the continuous partial spherical surface 16 have been subjected to abrasive blasting, abrasive blasting may be performed on one of the convex partial spherical surface 15 and the concave partial spherical surface 21, or one of the continuous partial spherical surface 16 and the tapered surface 22.

Furthermore, although the above description has been provided in terms of an example in which the first perspective-control component 6 is directly secured to the back side of the image sensor 5, the scope of the present invention is not limited to this example, and the first perspective-control component 6 may be secured to the back side of the image sensor 5 via a substrate (for example, a flexible substrate).

Although a preferred embodiment of the present invention that is conceivable at the current point of time has been described above, it should be understood that various variations of the present embodiment are possible, and the attached claims are intended to include all such variations within the true spirit and scope of the present invention.

INDUSTRIAL APPLICABILITY

As described above, the camera device according to the present invention enables the work for adjusting an inclination of an image plane relative to an optical axis (perspective control) to be solely performed in advance when assembling an image sensor into a case, providing the effect of increasing the degree of flexibility in the order for the perspective control work, and useful as, e.g., a monitoring camera or a home-use video camera.

REFERENCE SIGNS LIST 1 camera device
2 case
5 image sensor
6 first perspective-control component
7 second perspective-control component
15 convex partial spherical surface
16 continuous partial spherical surface 21 concave partial spherical surface
22 tapered surface

The invention claimed is:

1. A camera device comprising:
an image sensor which is assembled into a case;
a first perspective-control component which is attached to a back side of the image sensor and includes a convex partial spherical surface for adjusting an inclination of an image plane of the image sensor relative to an optical axis; and
a second perspective-control component which is mounted on the first perspective-control component and includes a concave partial spherical surface having a radius of curvature and a center of curvature which are equal to those of the convex partial spherical surface,
wherein before completion of the assembly of the image sensor into the case, the second perspective-control component can be mounted on the first perspective-control component, the inclination of the image plane can be adjusted with the convex partial spherical surface and the concave partial spherical surface in surface contact with each other, and the first perspective-control component and the second perspective-control component are adhesively secured and fixed to each other after completion of the adjustment.

2. The camera device according to claim 1, wherein a gap for receiving therein the adhesive for securing the first perspective-control component and the second perspective-control component to each other is formed between the first perspective-control component and the second perspective-control component.

3. The camera device according to claim 2,
wherein the first perspective-control component includes a continuous partial spherical surface which is continuous with the convex partial spherical surface;
wherein the second perspective-control component includes a tapered surface facing the continuous partial spherical surface; and
wherein the gap for receiving the adhesive therein is formed between the continuous partial spherical surface and the tapered surface.

4. The camera device according to claim 3, wherein one of the convex partial spherical surface and the concave partial spherical surface or one of the continuous partial spherical surface and the tapered surface has been subjected to abrasive blasting.

5. A method for manufacturing a camera device including an image sensor which is assembled into a case, a first perspective-control component including a convex partial spherical surface for adjusting an inclination of an image plane of the image sensor relative to an optical axis, and a second perspective-control component including a concave partial spherical surface having a radius of curvature and a center of curvature which are equal to those of the convex partial spherical surface, the method comprising:
mounting the second perspective-control component on the first perspective-control component attached to a back side of the image sensor before completion of the assembly of the image sensor into the case;
adjusting the inclination of the image plane relative to the optical axis with the convex partial spherical surface and the concave partial spherical surface in surface contact with each other; and
adhesively securing and fixing the first perspective-control component and the second perspective-control component to each other after completion of the adjustment.

* * * * *